(12) United States Patent
Ohnemus

(10) Patent No.: US 11,873,926 B2
(45) Date of Patent: *Jan. 16, 2024

(54) PIPE CLAMP ASSEMBLY

(71) Applicant: ASC Engineered Solutions, LLC, Portsmouth, NH (US)

(72) Inventor: Gregory Nicholas Stagliano Ohnemus, Providence, RI (US)

(73) Assignee: ASC Engineered Solutions, LLC, Portsmouth, NH (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/116,548

(22) Filed: Mar. 2, 2023

(65) Prior Publication Data

US 2023/0204131 A1 Jun. 29, 2023

Related U.S. Application Data

(63) Continuation of application No. 17/235,675, filed on Apr. 20, 2021, now Pat. No. 11,629,798, which is a continuation of application No. 16/930,904, filed on Jul. 16, 2020, now Pat. No. 11,015,739, which is a continuation of application No. 16/144,514, filed on Sep. 27, 2018, now Pat. No. 10,781,944.

(51) Int. Cl.
*F16L 3/10* (2006.01)

(52) U.S. Cl.
CPC ........... *F16L 3/1016* (2013.01); *F16L 3/1091* (2013.01)

(58) Field of Classification Search
CPC ....... F16L 21/065; F16L 23/08; F16L 3/1016; F16L 23/04; F16L 3/1091; F16L 3/11
See application file for complete search history.

(56) References Cited

U.S. PATENT DOCUMENTS

| | | |
|---|---|---|
| 2,942,820 A | 6/1960 | Sherburne |
| 3,013,821 A | 12/1961 | Bogan |
| 3,467,943 A | 9/1969 | Adams |
| 3,575,367 A | 4/1971 | Welsh |
| 4,407,479 A | 10/1983 | Combe |
| 4,998,691 A | 3/1991 | Brown |
| 5,190,324 A | 3/1993 | Bird et al. |
| 6,065,782 A | 5/2000 | Allen, Jr. |
| 6,302,450 B1 | 10/2001 | Dole et al. |

(Continued)

OTHER PUBLICATIONS

Ohnemus, Gregory Nicholas Stagliano; Corrected Notice of Allowance for U.S. Appl. No. 16/144,514, filed Sep. 27, 2018, dated Aug. 19, 2020, 6 pgs.

(Continued)

*Primary Examiner* — Bradley Duckworth
(74) *Attorney, Agent, or Firm* — Taylor English Duma LLP

(57) ABSTRACT

A pipe clamp assembly includes a pipe clamp comprising a first clamp segment and a second clamp segment, the first clamp segment defining an inner surface, a first end, and a second end, the second clamp segment defining an inner surface, a first end, and a second end, the inner surfaces of the first and second clamp segments defining a void extending through the pipe clamp; and a support flange coupled to the pipe clamp between the first end of the first clamp segment and the first end of the second clamp segment, the support flange substantially perpendicular to the void and configured to support the pipe clamp assembly on a support surface; wherein the void is configured to align with a pipe opening formed in the support surface.

17 Claims, 4 Drawing Sheets

(56) References Cited

U.S. PATENT DOCUMENTS

| | | |
|---|---|---|
| 6,581,977 B1 | 6/2003 | Dole et al. |
| 6,779,762 B2 | 8/2004 | Shibuya |
| 7,097,141 B2 | 8/2006 | Heath |
| 7,140,579 B2 | 11/2006 | Kirschner |
| 7,325,776 B2 | 2/2008 | Shibuya |
| 7,546,986 B2 | 6/2009 | Kim |
| 7,798,535 B2 | 9/2010 | Calhoun |
| 8,100,368 B2 | 1/2012 | Jackson et al. |
| 8,646,732 B2 | 2/2014 | Birch |
| 8,726,607 B1 | 5/2014 | Kirschner |
| 8,746,632 B2 | 6/2014 | Walraven et al. |
| 9,046,197 B2 | 6/2015 | Cousineau |
| 9,383,039 B2 | 7/2016 | Hirst et al. |
| 9,777,870 B2 | 10/2017 | Roth |
| 10,107,428 B2 | 10/2018 | Kim |
| 10,240,692 B2 | 3/2019 | Won et al. |
| 10,781,944 B2 | 9/2020 | Ohnemus |
| 11,015,739 B2 | 5/2021 | Ohnemus |
| 11,629,798 B2 | 4/2023 | Ohnemus |
| 2008/0284161 A1 | 11/2008 | Dole et al. |
| 2015/0252916 A1 | 9/2015 | Heath et al. |
| 2017/0204994 A1 | 7/2017 | Reed |
| 2017/0276261 A1 | 9/2017 | Hargrave |
| 2018/0163905 A1 | 6/2018 | Ohnemus et al. |
| 2018/0163906 A1 | 6/2018 | Ohnemus et al. |
| 2018/0216754 A1 | 8/2018 | Ciasulli et al. |
| 2019/0086006 A1 | 3/2019 | Nam |
| 2020/0103052 A1 | 4/2020 | Ohnemus |
| 2020/0347963 A1 | 11/2020 | Ohnemus |
| 2021/0239238 A1 | 8/2021 | Ohnemus |

OTHER PUBLICATIONS

Ohnemus, Gregory Nicholas Stagliano; Final Office Action for U.S. Appl. No. 16/144,514, filed Sep. 27, 2018, dated May 7, 2020, 8 pgs.

Ohnemus, Gregory Nicholas Stagliano; Non-Final Office Action for U.S. Appl. No. 16/144,514, filed Sep. 27, 2018, dated Mar. 26, 2020, 14 pgs.

Ohnemus, Gregory Nicholas Stagliano; Notice of Allowance for U.S. Appl. No. 16/144,514, filed Sep. 27, 2018, dated May 27, 2020, 5 pgs.

Ohnemus, Gregory Nicholas Stagliano; Final Office Action for U.S. Appl. No. 16/930,904, filed Jul. 16, 2020, dated Nov. 4, 2020, 17 pgs.

Ohnemus, Gregory Nicholas Stagliano; Notice of Allowance for U.S. Appl. No. 16/930,904, filed Jul. 16, 2020, dated Jan. 29, 2021, 9 pgs.

Stagliano, Gregory Nicholas; Non-Final Office Action for U.S. Appl. No. 16/930,904, filed Jul. 16, 2020, dated Aug. 5, 2020, 13 pgs.

Ohnemus, Gregory Nicholas Stagliano; Non-Final Office Action for U.S. Appl. No. 17/235,675, filed Apr. 20, 2021, dated Aug. 16, 2022, 19 pgs.

Ohnemus, Gregory Nicholas Stagliano; Notice of Allowance for U.S. Appl. No. 17/235,675, filed Apr. 20, 2021, dated Dec. 5, 2022, 5 pgs.

PIPE CLAMP ASSEMBLY

CROSS-REFERENCE TO RELATED APPLICATIONS

The present application is a continuation of U.S. application Ser. No. 17/235,675, filed Apr. 20, 2021, which is a continuation of U.S. application Ser. No. 16/930,904, filed Jul. 16, 2020, which issued into U.S. Pat. No. 11,015,739 on May 25, 2021, which is a continuation of U.S. application Ser. No. 16/144,514, filed Sep. 27, 2018, which issued into U.S. Pat. No. 10,781,944 on Sep. 22, 2020, all of which are hereby incorporated by reference herein in their entireties.

TECHNICAL FIELD

This disclosure relates to pipe clamps. More specifically, this disclosure relates to a pipe clamp comprising a pipe-engaging projection.

BACKGROUND

Piping systems, such as fire sprinkler system piping and HVAC piping, can be mounted in a structure (e.g., a building) using various types of pipe support assemblies (e.g., hangers, stanchions, risers, slides, guides, seismic braces, rollers, etc.). Some piping systems are subject to dynamic loads (e.g., seismic loads from an earthquake or settling of the structure). Piping support assemblies can employ a seismic brace assembly to allow for movement of the piping system along with the structure in response to dynamic loads. Additionally, vertical piping systems are often supported by friction riser clamps, which are subject to performance variation from pipe manufacturing tolerances, various pipe finishes, pipe cutting oils, and variations in bolt torque. These same deficiencies may be present in longitudinal seismic braces, wherein a pipe clamp is used to prevent movement longitudinally along the pipe.

Pipe support assemblies commonly comprise a pipe clamp for engaging a pipe of the piping system with surrounding structure, such as walls or ceilings of a building or internal support structures of the building such as an I-beam. The pipe clamp can define a void therethrough within which the pipe is received. During a seismic event or another event that causes movement of the structure, the pipe can move relative to the pipe clamp, or vice versa, and the grip between the pipe clamp and the pipe can loosen. Further, pipe clamps can loosen over time due to movement and vibration of the pipe and pipe clamp relative to one another, which can cause further loosening of the grip between the pipe clamp and the pipe.

SUMMARY

It is to be understood that this summary is not an extensive overview of the disclosure. This summary is exemplary and not restrictive, and it is intended neither to identify key or critical elements of the disclosure nor delineate the scope thereof. The sole purpose of this summary is to explain and exemplify certain concepts off the disclosure as an introduction to the following complete and extensive detailed description.

Disclosed is a pipe clamp comprising a first clamp segment defining a first semi-cylindrical wall; a second clamp segment defining a second semi-cylindrical wall, the first semi-cylindrical wall and second semi-cylindrical wall defining a void therebetween; a first projection monolithically formed with the first clamp segment, the first projection extending from the first semi-cylindrical wall; and a fastener coupling the first clamp segment to the second clamp segment.

Also disclosed is a seismic brace assembly comprising a pipe clamp comprising a first clamp segment defining a first semi-cylindrical wall and a second clamp segment defining a second semi-cylindrical wall, the first semi-cylindrical wall defining a projection extending therefrom, the projection formed monolithically with the first clamp segment, the first semi-cylindrical wall and second semi-cylindrical wall defining a void therebetween; a brace member; and a fastener assembly coupling the brace member to the pipe clamp.

Also disclosed is a method for attaching a pipe clamp to a pipe comprising the steps of providing a first clamp segment, the first clamp segment defining a first semi-cylindrical wall and a first projection extending from the first semi-cylindrical wall, the first projection monolithically formed with the first clamp segment; providing a second clamp segment, the second clamp segment defining a second semi-cylindrical wall; positioning a pipe between the first clamp segment and the second clamp segment; engaging the pipe with the first projection; and fastening the first clamp segment to the second clamp segment.

A pipe clamp is disclosed, the pipe clamp comprising a first clamp segment defining an inner surface, an outer surface, a first side, and a second side, the inner surface defining a first semi-cylindrical wall; a second clamp segment defining an inner surface, an outer surface, a first side, and a second side, the inner surface defining a second semi-cylindrical wall, the first semi-cylindrical wall and second semi-cylindrical wall defining a cylindrical void wall, the cylindrical void wall defining a void, the void configured to receive a pipe extending therethrough; and a plurality of projections monolithically formed with and extending from the cylindrical void wall, wherein the plurality of projections are spaced apart in a circumferential row around the cylindrical void wall, the circumferential row oriented centrally between the first sides of the first and second clamp segments and the second sides of the first and second clamp segments, the plurality of projections configured to engage the pipe extending through the void.

Also disclosed is seismic brace assembly comprising a pipe clamp comprising: a first clamp segment defining a first semi-cylindrical wall; a second clamp segment defining a second semi-cylindrical wall, the first and second semi-cylindrical walls defining a cylindrical void wall, the cylindrical void wall defining a void; and a plurality of projections extending from the cylindrical void wall, the plurality of projections oriented in a circumferential row around a center of the cylindrical void wall; a pipe extending fully through the void, the pipe defining an outer surface, each of the plurality of projections engaging the outer surface; a brace member; and a fastener assembly rotatably coupling the brace member to the pipe clamp.

A method for attaching a pipe clamp to a pipe is also disclosed, the method comprising providing a first clamp segment, the first clamp segment defining a first lip, a first semi-cylindrical wall, and a first plurality of projections extending from the first semi-cylindrical wall; providing a second clamp segment, the second clamp segment defining a second lip, and a second semi-cylindrical wall, and a second plurality of projections extending from the second semi-cylindrical wall, wherein a slot is defined between the first lip and second lip, and wherein the first clamp segment and second clamp segment defining a void therebetween;

positioning a pipe within the void between the first clamp segment and the second clamp segment; inserting a fastener through a first opening of the first clamp segment and a second opening of the second clamp segment; tightening the fastener to deform the first clamp segment and second clamp segment against the pipe and to draw the first lip towards the second lip; and engaging the pipe with the first and second plurality of projections.

Furthermore, disclosed is a pipe clamp assembly comprising a pipe clamp comprising a first clamp segment and a second clamp segment, the first clamp segment defining an inner surface, a first end, and a second end, the second clamp segment defining an inner surface, a first end, and a second end; a projection extending from the inner surface of the first clamp segment, the projection defining a linear top edge configured to engage a pipe, the linear top edge oriented distal to the inner surface of the first clamp segment; and a support flange coupled to the pipe clamp proximate to the first end of the first clamp segment and the first end of the second clamp segment, the support flange configured to support the pipe clamp assembly on a support surface.

A method of supporting a pipe with a pipe clamp assembly is also disclosed, the method comprising providing a pipe clamp comprising defining a first end, a second end opposite the first end, and a cylindrical void wall, a projection extending from the cylindrical void wall, the projection defining a linear top edge distal to the cylindrical void wall; positioning a pipe within a void of the pipe clamp, the void defined by the cylindrical void wall; tightening the pipe clamp around the pipe to engage the linear top edge of the projection with the pipe; coupling a support flange to the pipe clamp; and resting a base surface of the support flange on a support surface to support the pipe on the support surface.

Additionally, disclosed is a pipe clamp assembly comprising a pipe clamp comprising a first clamp segment and a second clamp segment, the first clamp segment defining an inner surface, a first end, and a second end, the second clamp segment defining an inner surface, a first end, and a second end, the inner surfaces of the first and second clamp segments defining a void extending through the pipe clamp; and a support flange coupled to the pipe clamp between the first end of the first clamp segment and the first end of the second clamp segment, the support flange substantially perpendicular to the void and configured to support the pipe clamp assembly on a support surface; wherein the void is configured to align with a pipe opening formed in the support surface.

Also disclosed is a method of supporting a pipe with a pipe clamp assembly comprising: providing a pipe clamp comprising a first clamp segment and a second clamp segment, each of the first clamp segment and the second clamp segment defining a first end and a second end opposite the first end; inserting the pipe through a pipe opening in a substantially horizontal support surface; positioning the pipe within a substantially vertical void of the pipe clamp, the substantially vertical void defined between the first clamp segment and the second clamp segment; coupling a support flange to the pipe clamp, the support flange extending substantially horizontally from the pipe clamp; and resting a base surface of the support flange on the substantially horizontal support surface to support the pipe on the substantially horizontal support surface.

Various implementations described in the present disclosure may include additional systems, methods, features, and advantages, which may not necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims.

BRIEF DESCRIPTION OF THE DRAWINGS

The features and components of the following figures are illustrated to emphasize the general principles of the present disclosure. Corresponding features and components throughout the figures may be designated by matching reference characters for the sake of consistency and clarity.

DETAILED DESCRIPTION

Figure 1:
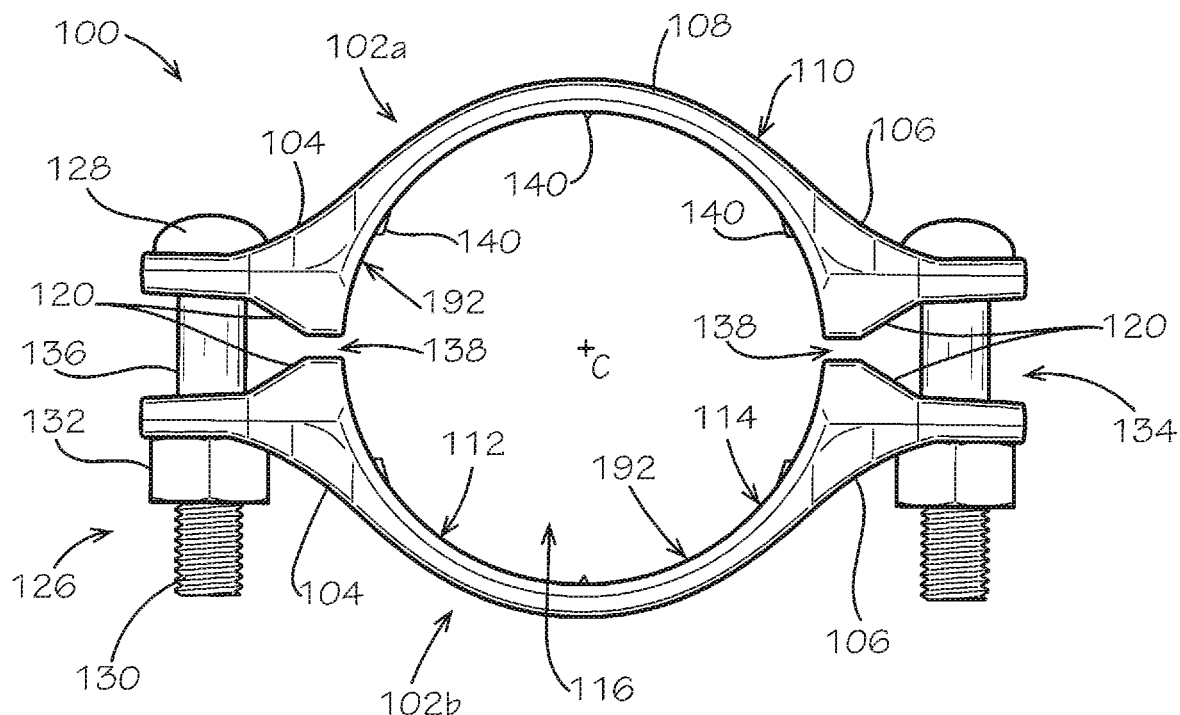
FIG. 1 shows a front view of a pipe clamp comprising a pair of clamp halves defining a plurality of projections, in accordance with one aspect of the present disclosure.

The present disclosure can be understood more readily by reference to the following detailed description, examples, drawings, and claims, and the previous and following description. However, before the present devices, systems, and/or methods are disclosed and described, it is to be understood that this disclosure is not limited to the specific devices, systems, and/or methods disclosed unless otherwise specified, and, as such, can, of course, vary. It is also to be understood that the terminology used herein is for the purpose of describing particular aspects only and is not intended to be limiting.

The following description is provided as an enabling teaching of the present devices, systems, and/or methods in its best, currently known aspect. To this end, those skilled in the relevant art will recognize and appreciate that many changes can be made to the various aspects of the present devices, systems, and/or methods described herein, while still obtaining the beneficial results of the present disclosure. It will also be apparent that some of the desired benefits of the present disclosure can be obtained by selecting some of the features of the present disclosure without utilizing other features. Accordingly, those who work in the art will recognize that many modifications and adaptations to the present disclosure are possible and can even be desirable in certain circumstances and are a part of the present disclosure. Thus, the following description is provided as illustrative of the principles of the present disclosure and not in limitation thereof.

As used throughout, the singular forms "a," "an" and "the" include plural referents unless the context clearly dictates otherwise. Thus, for example, reference to "an element" can include two or more such elements unless the context indicates otherwise.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

For purposes of the current disclosure, a material property or dimension measuring about X or substantially X on a particular measurement scale measures within a range between X plus an industry-standard upper tolerance for the specified measurement and X minus an industry-standard lower tolerance for the specified measurement. Because tolerances can vary between different materials, processes and between different models, the tolerance for a particular measurement of a particular component can fall within a range of tolerances.

As used herein, the terms "optional" or "optionally" mean that the subsequently described event or circumstance can or cannot occur, and that the description includes instances where said event or circumstance occurs and instances where it does not.

The word "or" as used herein means any one member of a particular list and also includes any combination of members of that list. Further, one should note that conditional language, such as, among others, "can," "could," "might," or "may," unless specifically stated otherwise, or otherwise understood within the context as used, is generally intended to convey that certain aspects include, while other aspects do not include, certain features, elements and/or steps. Thus, such conditional language is not generally intended to imply that features, elements and/or steps are in any way required for one or more particular aspects or that one or more particular aspects necessarily include logic for deciding, with or without user input or prompting, whether these features, elements and/or steps are included or are to be performed in any particular aspect.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific aspect or combination of aspects of the disclosed methods.

Disclosed in the present application is a pipe clamp and associated methods, systems, devices, and various apparatus. Example aspects of the pipe clamp can comprise a pair of clamp halves and a pair of fasteners that can couple the clamp halves together. The pipe clamp can be configured to engage a pipe of a piping system. The pipe clamp can also comprise a projection extending from one of the pair of clamp halves for engaging the pipe to improve the grip between the pipe clamp and the pipe. It would be understood by one of skill in the art that the disclosed pipe clamp is described in but a few exemplary aspects among many. No particular terminology or description should be considered limiting on the disclosure or the scope of any claims issuing therefrom.

FIG. 1 illustrates a first aspect of a pipe clamp 100 according to the present disclosure. The pipe clamp 100 can comprise a pair of clamp halves 102a,b. Each of the clamp halves 102a,b can define a first end 104, an opposing second end 106, and a central section 108 between the first end 104 and second end 106. Example aspects of the first end 104 and second end 106 can each be referred to as a clamp ear. In the current aspect, each of the first end 104 and the second end 106 can define fastener lugs extending from the central section 108. Further, each of the clamp halves 102a,b can define an outer surface 110 and an inner surface 112. The first ends 104 of the clamp halves 102a,b can be oriented adjacent one another, and the second ends 106 can be oriented adjacent one another, with the inner surfaces 112 of the clamp halves 102a,b facing towards each other. The inner surface 112 of the central section 108 of each clamp half 102a,b can each respectively define a generally semi-cylindrical wall 192 defining a generally semi-circular cross-section. The pair of semi-cylindrical walls 192 can together define generally cylindrical void wall 114. The void wall 114 can define a void 116 within which a pipe 418 (shown in FIG. 4) can be received. The pipe clamp 100 can further define a void axis C extending along a centerline of the void 116.

Each of the first ends 104 of the clamp halves 102a,b can comprise a lip 120 projecting from the inner surfaces 112 thereof, proximate to the corresponding semi-cylindrical wall 192. Example aspects of the lip 120 can be referred to as a clamp pad. Further, each of the second ends 106 of the clamp halves 102a,b can comprise a lip 120 projecting from the inner surfaces 112 thereof, proximate to the corresponding semi-cylindrical wall 192. According to example aspects, a portion of each lip 120 can define a portion of the cylindrical void wall 114. Each of the first ends 104 and second ends 106 of the clamp halves 102a,b can also define an opening 222 (shown in FIG. 2) extending from the outer surface 110 to the inner surface 112 and located proximate to a corresponding lip 120. As such, according to example aspects, each lip 120 can be oriented between the void 116 and a corresponding opening 222. Outer surfaces 110 of the clamp halves 102a,b can define a generally sinusoidal profile, as shown. Further, example aspects of the clamp halves 102a,b can define one or more ribs 424 (shown in FIG. 4) formed on the outer surfaces 110 of the clamp halves 102a,b. For example, each of the first ends 104 and second ends 106 of the clamp halves 102a,b can define a rib 424 extending along opposite sides thereof.

According to example aspects, the clamp halves 102a,b can be formed from a cast material, such cast iron, including ductile iron in some aspects, as will be discussed in further detail later in the present disclosure. In other example aspects, the clamp halves 102a,b can be formed from another suitable material, or a combination of materials, that are known in the art, including but not limited to other metals, plastic, resin, synthetic materials, and fibers. According to example aspects, the void wall 114 of the pipe clamp 100 can define a substantially circular cross-sectional shape, as shown, to engage a pipe 418 that also defines a substantially circular cross-sectional shape. However, according to other aspects, the void wall 114 can be formed with another cross-sectional shape, as desired, including, for example, oval, square, rectangular, triangular, trapezoidal, pentagonal, etc., to match varying cross-sectional shapes of piping.

The pair of clamp halves 102a,b can be coupled together by the pair of fasteners 126. The fasteners 126 can be, for example, track bolts or standard hex bolt. Example aspects of the fasteners 126 can be generally mushroom-shaped, comprising a dome-shaped head end 128 and a cylindrical tail end 130 extending therefrom. In some aspects, the cylindrical tail end 130 of the fastener 126, or a portion thereof, can comprise threading, as shown. The threaded tail end 130 of a first one of the fasteners 126 can be configured to pass through the openings 222 in the lugs of the first ends 104 of the clamp halves 102a,b, and the threaded tail end 130 of the second one of the fasteners 126 can be configured to pass through the openings 222 in the lugs of the second ends 106 of the clamp halves 102a,b. As shown, according to example aspects, the dome-shaped head ends 128 of the fasteners 126 can abut the outer surface 110 of a first one of the clamp halves 102a adjacent a corresponding opening 222. Each of the fasteners 126 can be secured to the clamp halves 102a,b, and can secure the clamp halves 102a,b to one another, by coupling a mating threaded nut 132 to the threaded tail end 130 of the fastener 126 and tightening the nut 132 against the outer surface 110 of the other one of the clamp halves 102b. For example, the nut 132 can be a standard hex nut. The nut 132 can be tightened against the outer surface 110 as desired to reach a preferred engagement strength between the pipe clamp 100 and the pipe 418 (shown in FIG. 4). The fastener 126 and the nut 132 can be formed from any suitable material, including, but not limited to, metal and plastic, such stainless steel. Further, in other aspects, the fasteners 126 can be clips, rivets, snaps, adhesives, welds, or any other fastening device known in the art. Moreover, while two fasteners 126 are shown in the example aspect of FIG. 1, one of skill in the art will appreciate that another number of fasteners 126 can be used to couple the clamp halves 102a,b together. Furthermore, the clamp halves 102a,b can be defined as segments of the pipe clamp 100, and in other aspects, the segments can be defined as quarters or thirds, or any other number of segments can be used in other aspects.

As shown, the first ends 104 of the clamp halves 102a,b can be disposed adjacent one another, and the second ends 106 of the clamp halves 102a,b can be disposed adjacent one another. In example aspects, a gap 134 can be defined between each of the first ends 104 and the second ends 106. A section of the tail end 130 of the corresponding fastener 126 can extend through the gap 134.

The pair of lips 120 projecting inwardly from the first ends 104 of the clamp halves 102a,b can be spaced apart to define a slot 138 therebetween, and the pair of lips 120 projecting inwardly from the second ends 106 can be spaced apart to define a slot 138 therebetween. Each slot 138 can define a pathway extending from the corresponding gap 134 to the void 116. According to example aspects, each slot 138 can define a width that can be less than a width of the gap 134 and a width of the void 116. In other example aspects, each of the pairs of lips 120 can be touching. Further, in still other aspects, the clamp halves 102a,b can be formed without lips 120 projecting therefrom. Example aspects of the pipe clamp 100 can further comprise a bearing 136 positioned around the section of the fastener 126 disposed in the gap 134, and the bearing 136 can be configured to rotate relative to the fastener 126. In some aspects, the bearing 136 can serve to maintain a pre-determined minimum distance between the clamp halves 102a,b, setting minimum widths of the gap 134 and the slot 138. By preventing the ends 104,106 from contact, the slots 138 allow the clamp halves 102a,b to deform fully against the pipe 418 during tightening of the pipe clamp 100 and engage the pipe 418 along the entire distance of the semi-cylindrical walls 192.

Figure 2:
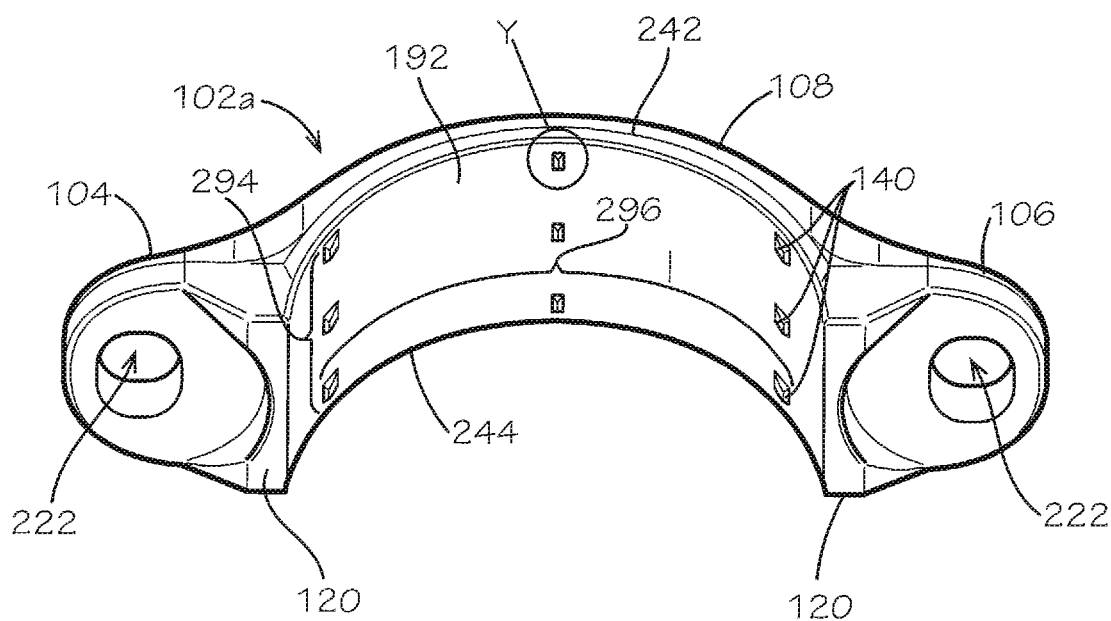
FIG. 2 shows a perspective view of one of the clamp halves of FIG. 1.

The pipe clamp 100 can further comprise features for improving the grip between the pipe clamp 100 and the pipe 418. For example, the pipe clamp 100 can comprise one or more projections 140 configured to engage the pipe 418 received within the void 116. As shown in FIG. 2, an example aspect of the clamp halves 102a,b can comprise a plurality of projections 140 disposed on the semi-cylindrical walls 192. One or both of the clamp halves 102a,b can comprise the projections 140. In example aspects, the projections 140 can be configured to lie in a series of columns 294 extending from a first side 242 of the semi-cylindrical wall 192 to a second side 244 of the semi-cylindrical wall 192 and a series of rows 296 extending circumferentially about the semi-cylindrical wall 192. Thus, a pipe 418 (shown in FIG. 4) received in the void 116 (shown in FIG. 1) can be engaged by the projections 140 along the length of the semi-cylindrical wall 192. In other aspects, the projections 140 can be arranged in another fashion. The projections 140 can provide a more positive engagement between the pipe clamp 100 and the pipe 418, which can aid in preventing the pipe 418 received within the void 116 from moving with respect to the pipe clamp 100, and vice versa.

Figure 3:
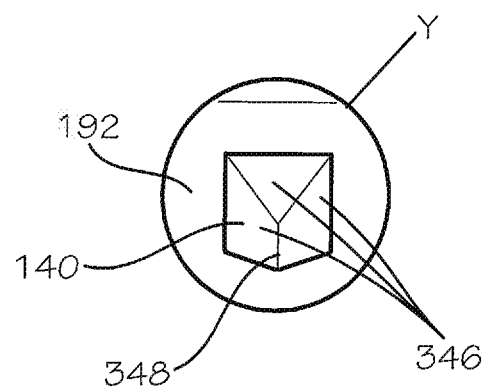
FIG. 3 shows a perspective view of Detail Y of FIG. 2.

FIG. 3 shows Detail Y of FIG. 2, which illustrates a close-up view of one of the projections 140 formed on the semi-cylindrical wall 192. As shown, example aspects of the projection 140 can be formed as a triangular prism. The projection 140 can comprise four walls 346 (three of which are shown) extending from the semi-cylindrical wall 192. A base of the projection 140 can be integrally formed with the semi-cylindrical wall 192. The walls 346 of the projection 140 can meet at their upper ends to form a top edge 348 of the projection 140. Example aspects of the top edge 348 of the projection 140 can extend generally parallel to the void wall 114 (shown in FIG. 1) and to the void axis C extending through the void 116 (shown in FIG. 1). According to other aspects, the projections 140 can define another shape, such as a tetrahedron, a triangular pyramid, a square pyramid, a cone, a hemisphere, etc. In still other aspects, the projections 140 can be formed on the pipe 418 (shown in FIG. 4) and can be configured to engage the void wall 114 of the pipe clamp 100. Moreover, other example aspects of the pipe clamp 100 and/or pipe 418 can comprise other or additional mechanisms for increasing the grip strength between the pipe clamp 100 and the pipe 418.

As noted above, example aspects of the clamp halves 102a,b can be formed from cast material. In one example aspect, the clamp halves 102a,b can be formed from cast iron. The clamp halves 102a,b can be cast from cast material by casting the clamp halves 102a,b in a mold, such as, for example, by sand casting or shell-mold casting. A benefit of forming the clamp halves 102a,b from cast material can be that the projections 140 can be formed integrally with the clamp halves 102a,b such that the projections 140 are monolithic with the clamp halves 102a,b. Forming the projections 140 integrally with the clamp halves 102a,b can reduce the likelihood of the projections 140 breaking off from the clamp halves 102a,b (as opposed to projections 140 that can be formed separately and attached to the clamp halves 102a,b via a fastener (not shown), such as, for example, an adhesive or welding, although these features could be present in other aspects of the current disclosure) and can thereby improve the performance of the pipe clamp 100. Moreover, forming the projections 140 integrally with the clamp halves 102a,b can reduce manufacturing time and costs. Still another benefit of cast material, such as cast iron, can be its strength compared to other similar materials, such as steel, which can be subject to stretching. Forming the clamp halves 102a,b and the projections 140 from cast iron can aid in preventing stretching and deformation of the clamp halves 102a,b and the projections 140 while simultaneously allowing the cast iron to deform against the pipe 418 if the curvature of the semi-cylindrical walls 192 does not match the curvature of the outer diameter of the pipe 418 during tightening to engage the pipe 418 more firmly and more consistently around the semi-cylindrical walls 192 and to dig the projections 140 more deeply into the pipe 418. In other aspects, the clamp halves 102a,b can be formed from another suitable material, or a combination of materials, that are known in the art, including but not limited to other metals, plastic, resin, synthetic materials, and fibers. Furthermore, in other aspects, the clamp halves can be formed by any other suitable methods of manufacturing, including, but not limited to, CNC machining, forging, sand casting, and investment casting.

Figure 4:
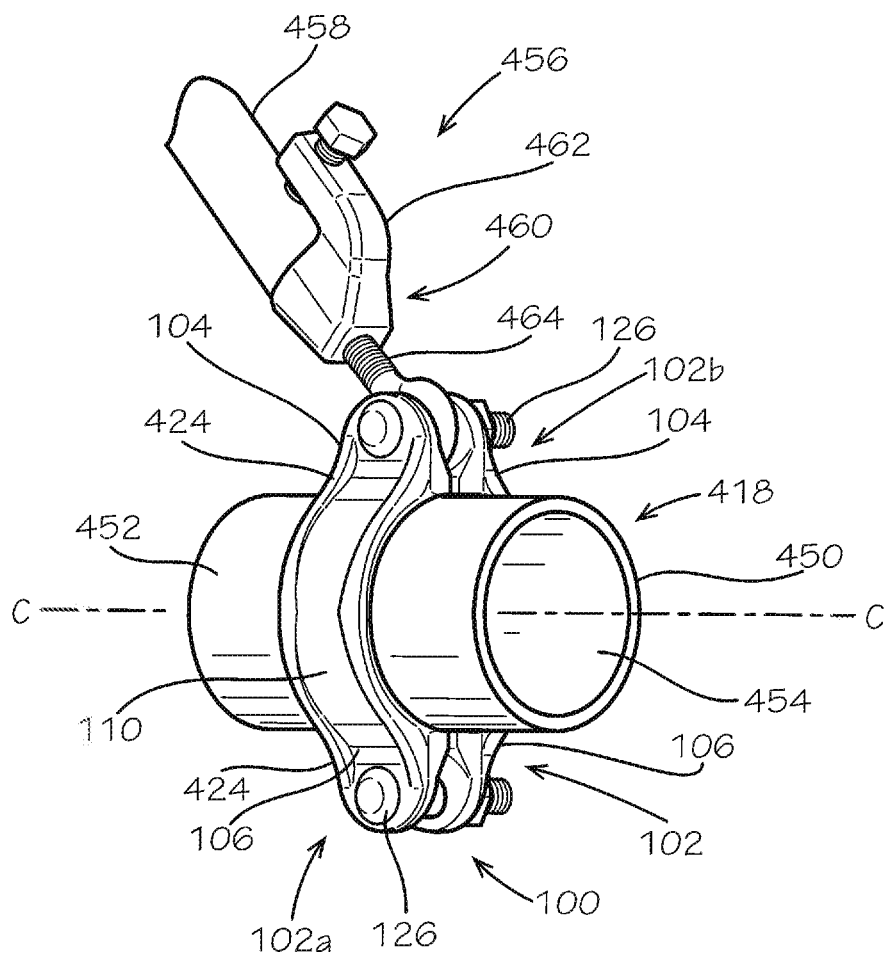
FIG. 4 shows a perspective view of the pipe clamp of FIG. 1 in engagement with a seismic brace assembly.

FIG. 4 illustrates the pipe clamp 100 in engagement with the pipe 418. The pipe 418 can be formed as a hollow tube comprising a cylindrical sidewall 450. The sidewall 450 of the pipe 418 can define an outer surface 452 and an inner surface 454. The clamp halves 102a,b can be positioned on opposing sides of the pipe 418 and can be fastened together around the pipe 418 by the fasteners 126. The pipe 418 can be received within the void 116 (shown in FIG. 1), and the void wall 114 (shown in FIG. 1) of the pipe clamp 100 can engage the outer surface 452 of the sidewall 450 of the pipe 418. As shown, void axis C can extend along a centerline of the void 116 and a centerline of the pipe 418. The fasteners 126 can be selectively tightened, as described above with reference to FIG. 1, so that the pipe clamp 100 can engage the pipe 418 at a desired strength. As the fasteners 126 are tightened, the projections 140 (shown in FIG. 1) projecting from the void wall 114 can be pressed into the outer surface 452 of the pipe sidewall 450, increasing the grip strength between the pipe clamp 100 and the pipe 418. The increased grip strength can aid in preventing the pipe 418 from moving with respect to the pipe clamp 100, and vice versa. Example aspects of the pipe 418 can be formed from a cast material, such as cast iron. Examples of cast iron can include ductile iron, gray iron, and malleable iron. In other example aspects, the pipe 418 can be formed from another suitable material, or a combination of materials, that are known in the art, including but not limited to plastic, other metals, resin, synthetic materials, and fibers.

According to example aspects, as shown in FIG. 4, the pipe clamp 100 can be coupled to a seismic brace assembly 456. The seismic brace assembly 456 can engage the pipe 418 of a piping system to support the piping system from a structure, such as an I-beam or a concrete wall or ceiling of a building, for movement along with the structure. The seismic brace assembly 456 can comprise a brace member 458 and a fastening assembly 460 for attaching the pipe clamp 100 to the brace member 458. Example aspects of the fastening assembly 460 can comprise a jaw 462 and a fastener, such as an eye bolt 464, coupled to the jaw 462. The jaw 462 can be coupled to the brace member 458, and the eye bolt 464 can be coupled to the pipe clamp 100. According to example aspects, the eye bolt 464 can be rotatable with respect to the pipe clamp 100 and can allow for movement of the brace member 458 with respect to the pipe clamp 100, and vice versa. For example, the eye bolt 464 can engage the intermediate portion of the fastener 126 that extends through gap 134 (shown in FIG. 1) formed between the first ends 104 of the clamp halves 102a,b. In some aspects, the eye bolt 464 can engage the bearing 136 (shown in FIG. 1) that can be rotatably coupled to the fastener 126. The seismic brace assembly 456 can be mounted to a structure, and can be movable with respect to the structure, allowing the pipe 418, and the associated piping system, to move along with the structure during, for example, a seismic event, or another event that can cause movement of a structure, such as settling. In other example aspects, the eye bolt 464 can be replaced with another suitable fastener known in the art.

Figure 5:
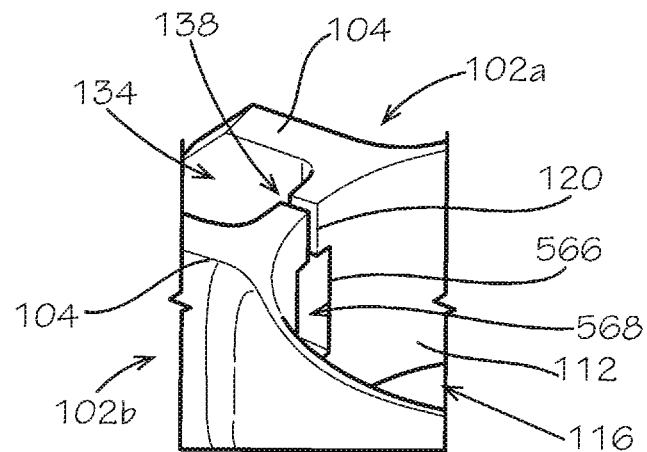
FIG. 5 shows a perspective detail view of a portion of another aspect of a pipe clamp, in accordance with the present disclosure.

FIG. 5 illustrates another example aspect of the clamp halves 102a,b. As shown, a notch 566 can be formed in each of the lips 120 extending from the inner surfaces 112 of the opposing first ends 104. Example aspects can further comprise a similar notch 566 formed in each of the lips 120 extending from the opposing second ends 106 (shown in FIG. 1). The notches 566 formed in each adjacent pair of lips 120 can define an orifice therebetween, such as a passage 568 extending between the void 116 and the corresponding gap 134. Example aspects of the passage 568 can be referred to as a pad slot. According to other example aspects, the orifice can define a recess (not shown), as opposed to a passage, that does not extend through to the void 116. Example aspects of the notches 566 and the passages 568 defined by the notches 566 can define a generally rectangular cross-sectional shape. Example aspects of the passages 568 can be wider than the slots 138 formed between the corresponding pairs of lips 120.

Figure 6:
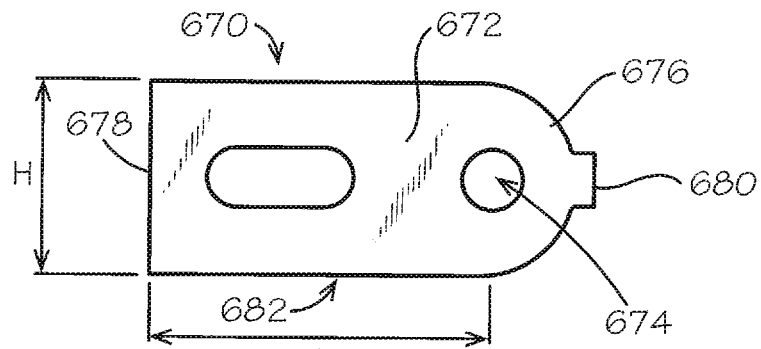
FIG. 6 shows a front view of a support flange, in accordance with one aspect of the present disclosure.

FIG. 6 illustrates an example aspect of a support flange 670. The support flange 670 can comprise a flange body 672 and a hole 674 formed in the flange body 670. In example aspects, the hole 674 can be a through-hole. The flange body 670 can define a first end 676 and a second end 678. According to example aspects, the first end 676 of the flange body 672 can define a generally curved profile, and the second end 678 of the flange body 672 can define a generally straight profile. The first end 676 of the flange body 672 can comprise a key 680 extending therefrom. The flange body 672 can define a base surface 682 extending between the first end 676 and second end 678. Example aspects of the base surface 682 can be substantially flat to engage a substantially flat support surface (not shown) of a structure. Further, according to example aspects, a length L of the base surface 682 of the flange body 672 can be greater than a height H of the flange body 672. Example aspects of the support flange 670 can be formed from a metal material, such as steel or cast iron, including ductile iron in some aspects. In other example aspects, the support flange 670 can be formed from another suitable material, or a combination of materials, that are known in the art, including but not limited to plastic, other metals, resin, synthetic materials, and fibers.

Figure 7:
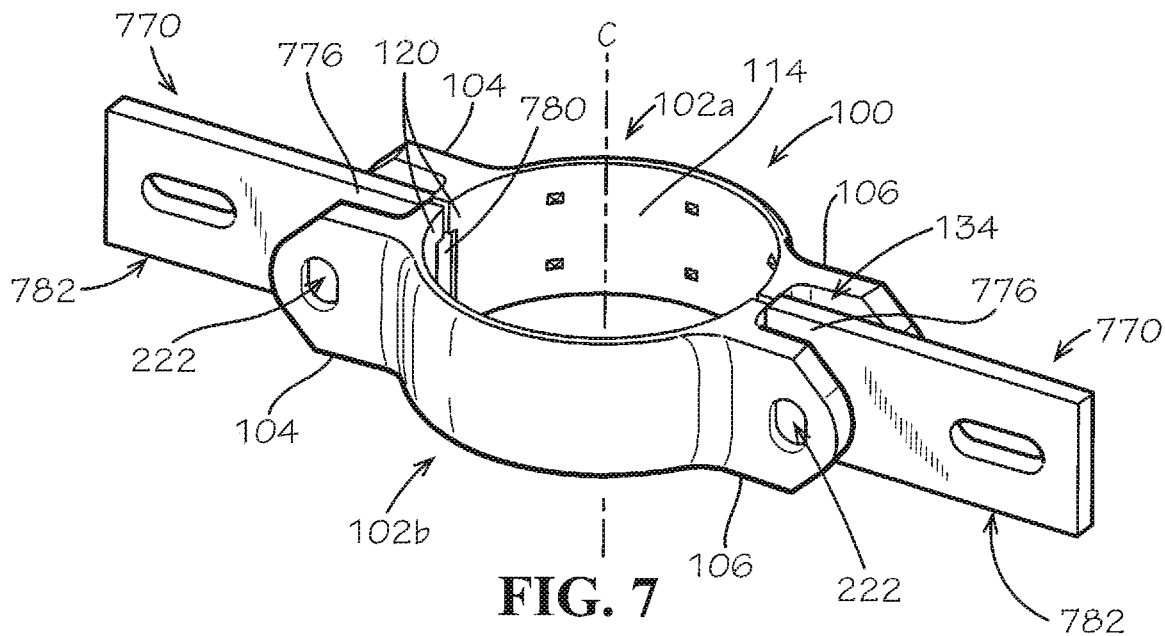
FIG. 7 shows a perspective view of the pipe clamp of FIG. 5 in engagement with a pair of support flanges according to another aspect of the present disclosure.

According to example aspects, as shown in FIG. 7, the pipe clamp 100 can be configured to engage a pair of the support flanges 770. A first one of the support flanges 770 can be coupled to the first ends 104 of the clamp halves 102a,b, and a second one of the support flanges 770 can be coupled to the second ends 106 of the clamp halves 102a,b. As shown, the first end 776 of each support flange 770 can be received within the corresponding gap 134 formed between the first ends 104 and second ends 106. In the depicted example aspect of FIG. 7, the first ends 776 of the support flanges 770 define a straight profile with squared ends, as opposed to the curved profile illustrated in the example aspect of FIG. 6. The key 780 of each flange 770 can be received within the corresponding passage 568 (shown in FIG. 5) formed between the corresponding pair of lips 120. According to example aspects, the passage 568 can be sized to substantially match the size of the key 780, or can be just slightly larger than the key 780, such that movement of the key 780 within the passage 568 can be limited. A hole (not shown) formed in each of the support flanges 770 can be configured to align with the corresponding openings 222 in the first ends 104 and second ends 106 of the clamp halves 102*a,b*, and the fasteners 126 (shown in FIG. 8) can pass through the holes 774 formed in the support flanges 770 and the openings 222 formed in clamp halves 102*a,b*. Example aspects of the support flanges 770 can extend in a direction that can be substantially perpendicular to the void wall 114 and the void axis C (shown in FIG. 1), and the base surface 782 of the support flange 770 can face downward, relative to the orientation shown. Further, example aspects of the support flanges 770 can comprise a generally rectangular cross-section.

Figure 8:
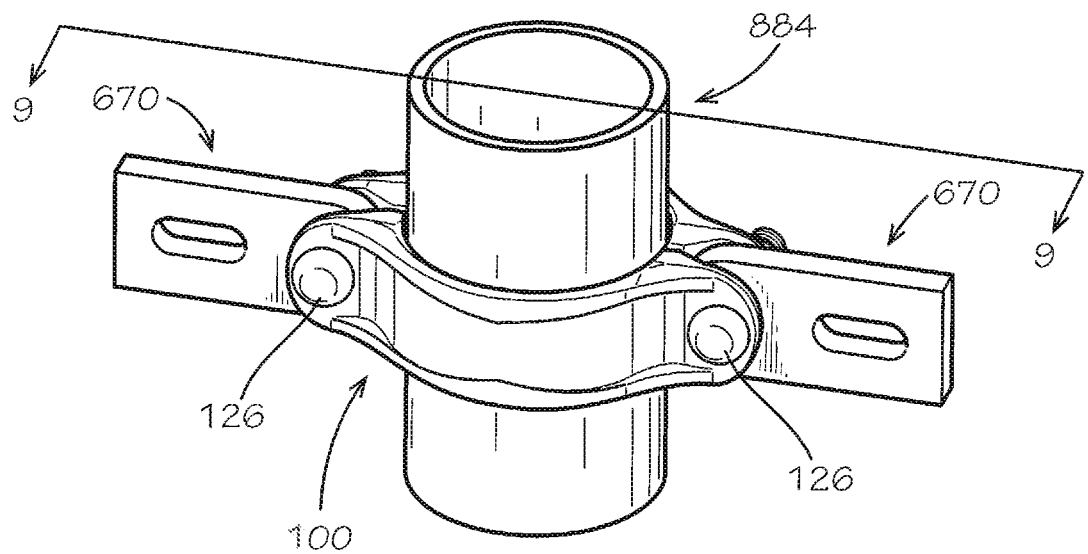
FIG. 8 shows a perspective view of the pipe clamp of FIG. 5 in engagement with a pipe and a pair of the support flanges of FIG. 6.

As shown in FIG. 8, example aspects of the pipe clamp 100 can engage a riser pipe 884. The riser pipe 884 can be part of a larger piping system, such as a fire protection system, that can be installed in a structure and typically extend upwards through the structure. The riser pipe 884 can be received within the void 116 (shown in FIG. 1) of the pipe clamp 100 and the fasteners 126 can be tightened such that the void wall 114 (shown in FIG. 1) and projections 140 (shown in FIG. 1) extending therefrom engage the riser pipe 884 at a desired strength. The pipe clamp 100 can further comprise a pair of the support flanges 670 extending therefrom.

Figure 9:
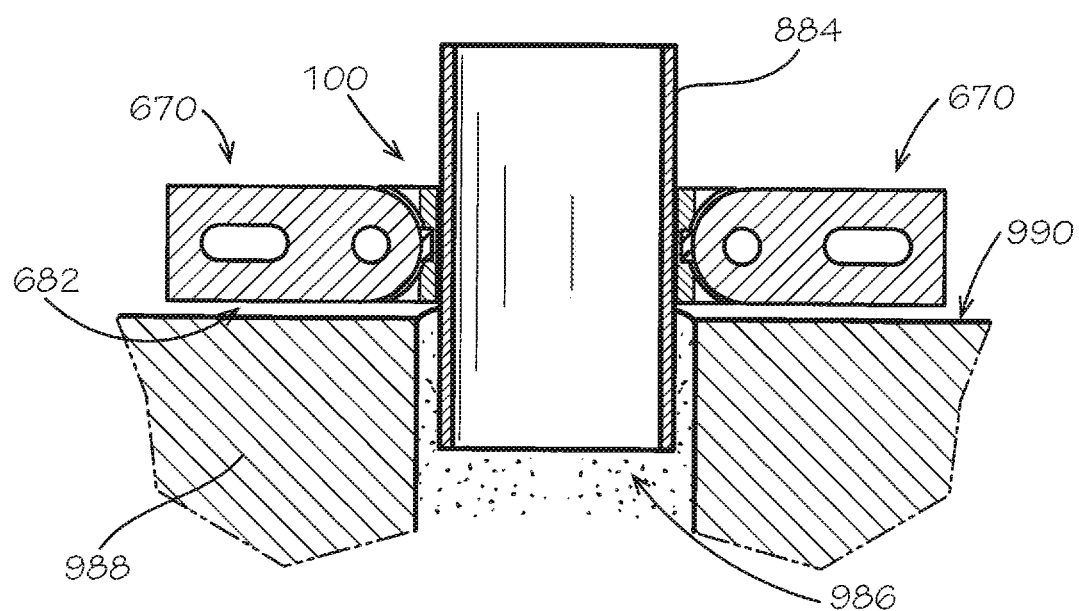
FIG. 9 shows a front, cross-sectional view of FIG. 8 taken along line 9-9 and in engagement with a floor.

FIG. 9 illustrates a front cross-sectional view of the example aspect of FIG. 8 taken along line 9-9 as shown in FIG. 8, further in engagement with a support surface. The riser pipe 884 can extend through an opening 986 in a support surface, such as a concrete floor 988. The pipe clamp 100 and support flanges 670 can be oriented above the floor 988, relative to the orientation shown. The base surfaces 682 of the pair of support flanges 670 can rest on and bear downwardly upon the concrete floor 988 to transfer a portion of the load of the piping system to the concrete floor 988. An upper surface 990 of the concrete floor 988 can define a substantially flat profile to match the substantially flat profile of the base surface 682 of each of the flanges 670. The base surfaces 682 of the flanges 670 can be attached to the upper surface 990 of the concrete floor 988 by a fastener (not shown)—for example screws, bolts, clips, rivets, snaps, adhesives, welds, or any other suitable fastener known in the art. In other aspects, the base surface 682 of each of the support flanges 670 can rest on the upper surface 990 of the concrete floor 988 without being attached to the concrete floor 988.

One should note that conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more particular embodiments or that one or more particular embodiments necessarily include logic for deciding, with or without user input or prompting, whether these features, elements and/or steps are included or are to be performed in any particular embodiment.

It should be emphasized that the above-described embodiments are merely possible examples of implementations, merely set forth for a clear understanding of the principles of the present disclosure. Any process descriptions or blocks in flow diagrams should be understood as representing modules, segments, or portions of code which include one or more executable instructions for implementing specific logical functions or steps in the process, and alternate implementations are included in which functions may not be included or executed at all, may be executed out of order from that shown or discussed, including substantially concurrently or in reverse order, depending on the functionality involved, as would be understood by those reasonably skilled in the art of the present disclosure. Many variations and modifications may be made to the above-described embodiment(s) without departing substantially from the spirit and principles of the present disclosure. Further, the scope of the present disclosure is intended to cover any and all combinations and sub-combinations of all elements, features, and aspects discussed above. All such modifications and variations are intended to be included herein within the scope of the present disclosure, and all possible claims to individual aspects or combinations of elements or steps are intended to be supported by the present disclosure.

That which is claimed is:

1. A pipe clamp assembly comprising:
   a pipe clamp comprising a first clamp segment and a second clamp segment, the first clamp segment defining an inner surface, a first end, and a second end, the second clamp segment defining an inner surface, a first end, and a second end, the inner surfaces of the first and second clamp segments defining a void extending through the pipe clamp; and
   a support flange coupled to the pipe clamp between the first end of the first clamp segment and the first end of the second clamp segment, the support flange substantially perpendicular to the void and configured to support the pipe clamp assembly on a support surface;
   wherein:
   the void is configured to align with a pipe opening formed in the support surface;
   the pipe clamp defines a passage formed between the first clamp segment and the second clamp segment;
   the support flange defines a flange body and a key extending from a first body end of the flange body;
   the key engages the passage of the pipe clamp;
   the first clamp segment defines a first notch and the second clamp segment defines a second notch aligned with the first notch; and
   the first notch and second notch cooperate to define the passage.

2. The pipe clamp assembly of claim 1, wherein the void extends substantially vertically through the pipe clamp, the support flange extends substantially horizontally from the pipe clamp, and a base surface of the support flange is configured to rest on a substantially horizontal upper surface of the support surface.

3. The pipe clamp assembly of claim 2, wherein a length of the support flange is greater than a height of the support flange.

4. The pipe clamp assembly of claim 3, wherein the length and the height of the support flange are greater than a depth of the support flange.

5. The pipe clamp assembly of claim 1, wherein a height of the key is less than a height of the flange body.

6. The pipe clamp assembly of claim 1, wherein:
   the first clamp segment defines a first lip extending from the inner surface thereof proximate to the first end thereof;
   the first notch is defined in the first lip;

the second clamp segment defines a second lip extending from the inner surface thereof proximate to the first end thereof; and the second notch is defined in the second lip.

7. The pipe clamp assembly of claim 6, wherein the first lip and the second lip are spaced apart and define a slot therebetween to allow for deformation of the first clamp segment and the second clamp segment around the pipe.

8. The pipe clamp assembly of claim 1, wherein the first clamp segment defines a first lug at the first end thereof, the second clamp segment defines a second lug at the first end thereof, the first lug is spaced from and substantially parallel to the second lug, and the first body end of the support flange is disposed between the first lug and the second lug.

9. The pipe clamp assembly of claim 8, wherein the first lug defines a first opening, the second lug defines a second opening, the support flange defines a hole substantially aligned with each of the first opening and the second opening, and a fastener extends through each of the hole, the first opening, and the second opening to couple the support flange to the pipe clamp.

10. The pipe clamp assembly of claim 9, wherein the fastener is configurable in a tightened configuration, and wherein, in the tightened configuration, the first end of the first clamp segment is biased towards the first end of the second clamp segment.

11. The pipe clamp assembly of claim 1, wherein the passage is in communication with the void.

12. The pipe clamp assembly of claim 1, wherein:
the support flange is a first support flange;
the pipe clamp assembly further comprises a second support flange coupled to the pipe clamp between the second end of the first clamp segment and the second end of the second clamp segment; and
the second support flange is substantially perpendicular to the void and configured to further support the pipe clamp assembly on the support surface.

13. The pipe clamp assembly of claim 12, wherein the second support flange is substantially horizontally aligned with the first support flange.

14. A method of supporting a pipe with a pipe clamp assembly comprising:
providing a pipe clamp comprising a first clamp segment and a second clamp segment, each of the first clamp segment and the second clamp segment defining a first end and a second end opposite the first end;
inserting the pipe through a pipe opening in a substantially horizontal support surface;
positioning the pipe within a substantially vertical void of the pipe clamp, the substantially vertical void defined between the first clamp segment and the second clamp segment;
coupling a support flange to the pipe clamp, the support flange extending substantially horizontally from the pipe clamp; and
resting a base surface of the support flange on the substantially horizontal support surface to support the pipe on the substantially horizontal support surface;
wherein:
the pipe clamp defines a passage formed between the first clamp segment and the second clamp segment;
the support flange defines a flange body and a key extending from a first body end of the flange body; and
the first clamp segment defines a first notch and the second clamp segment defines a second notch aligned with the first notch; and
the first notch and second notch cooperate to define the passage
the method further comprises inserting the key of the support flange into the passage of the pipe clamp.

15. The method of claim 14, further comprising tightening the pipe clamp around the pipe, and wherein tightening the pipe clamp around the pipe comprises:
inserting a fastener through a first opening formed through the first end of the first clamp segment and a second opening formed through the first end of the second clamp segment; and
tightening the fastener to draw the first end of the first clamp segment towards the first end of the second clamp segment.

16. The method of claim 15, wherein the fastener is a bolt, and wherein tightening the fastener comprises tightening a nut on the bolt and pressing the nut against an outer surface of one of the first clamp segment and the second clamp segment.

17. The method of claim 15, wherein coupling the support flange to the pipe clamp comprises aligning a hole of the support flange between the first opening and the second opening and further inserting the fastener through the hole.

* * * * *